United States Patent

Kowalski

Patent Number: 4,546,384
Date of Patent: Oct. 8, 1985

[54] TEST METHOD FOR WORKPIECES

[75] Inventor: Günter Kowalski, Pinneberg, Fed. Rep. of Germany

[73] Assignee: U.S. Philips Corporation, New York, N.Y.

[21] Appl. No.: 355,978

[22] Filed: Mar. 8, 1982

[30] Foreign Application Priority Data

Mar. 25, 1981 [DE] Fed. Rep. of Germany ....... 3111728

[51] Int. Cl.⁴ .............................................. H04M 7/18
[52] U.S. Cl. .................................... 358/107; 358/101; 358/106; 356/390; 250/563; 250/223 R
[58] Field of Search ................. 358/93, 101, 105, 107, 358/106; 250/442.1, 562, 563, 223; 378/69; 356/390, 397

[56] References Cited

U.S. PATENT DOCUMENTS 3,932,042  1/1976  Faami et al. ......................... 356/390
4,179,704 12/1979  Moore et al. ........................ 358/108
4,378,495  3/1983  Miller ................................... 358/106

Primary Examiner—John C. Martin
Assistant Examiner—Edward L. Coles
Attorney, Agent, or Firm—Paul R. Miller

[57] ABSTRACT

The invention relates to a method for the testing of a workpiece which is moved past a stationary camera in order to record a sequence of images, the images being subsequently superposed so that the movement of the workpiece is compensated for Low-noise images of the workpiece are thus obtained.

10 Claims, 4 Drawing Figures

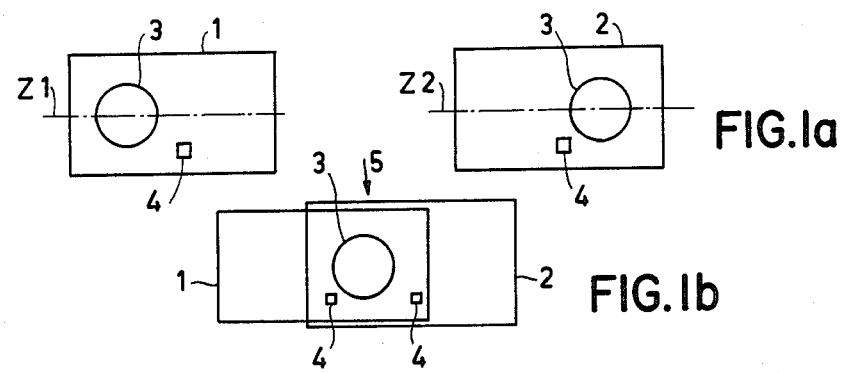
FIG.1a
FIG.1b
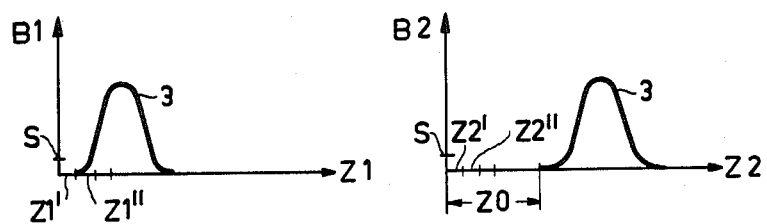
FIG.2
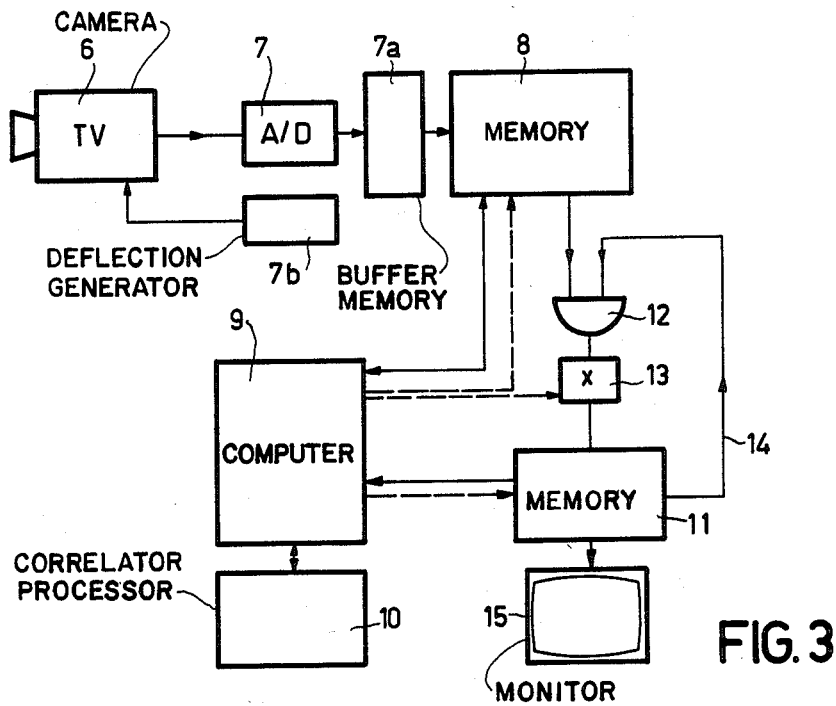
FIG.3

TEST METHOD FOR WORKPIECES

The invention relates to a method for testing workpieces which are moved past a stationary electronic camera which records a sequence of images of the workpiece, the relevant image information being stored in an electronic memory in order to be applied to an evaluation device.

BACKGROUND OF THE INVENTION

Test methods of this kind are known from DE-OS No. 27 20 865.

The systems suitable for performing the method can be used, for example, for the non-destructive testing of materials where the workpieces are irradiated by X-rays, the intercepted X-rays being converted into visible light by an image converter.

The existing systems, however, often have an insufficient signal-to-noise ratio. The noise is caused mostly by electrical noise as well as by quantum noise.

It is also known that by repetition of television images the noise can be reduced inversely proportionally to the root of the number of repeated images. This method, however, has the drawback that it can be used only for stationary objects which occupy a fixed position in the television image.

Moreover, not all interference effects are eliminated by this method. For example, a phase structure normally present in the camera tube is not suppressed, because it recurs in each image and is not subject to statistical fluctuations.

SUMMARY OF THE INVENTION

It is an object of the invention to provide a method whereby objects which occupy different positions in the camera image can be displayed with an improved signal-to-noise ratio.

This object is achieved in accordance with the invention in that the image information associated with different images is read and combined so that the measurement values associated with the same object points are superposed, the measurement values thus superposed being applied to an image display device.

Thus, an image of the object with an improved signal-to-noise ratio is obtained, because each time several measurement values of the same object point are superposed in a registering manner in accordance with the number of images recorded.

Preferably, those measurement values which are associated with different images, and which represent image points or image elements each time occupying the same position relative to the object, are also superposed. Such a processing of the measurement values corresponds, for example, to a shift of superposed images by an amount corresponding to the relevant object shift in a direction opposing the shift direction, so that the objects in the images substantially register. Subsequently superposition of the image information follows.

It is thus achieved that the noise is substantially suppressed in the superposition image due to its statistical behaviour. It is particularly advantageous that, for example, measurement values wich are caused by imperfect target structures of the camera, appear in different locations in the superposition image after the superposition. Thus, the image faults caused by the target structures are not superposed but are spread throughout the superposition image.

BRIEF DESCRIPTION OF THE DRAWING

Embodiments in accordance with the invention are shown in the drawing. Therein:

FIGS. 1a, b show two images recorded by means of an electronic camera which are superposed in order to form an improved image, FIG. 2 shows the amplitude variations of the two images, and FIG. 3 shows a device for the low-noise display of images.

DESCRIPTION OF PREFERRED EMBODIMENTS

FIG. 1a shows two images 1 and 2 which are displayed, for example, on a monitor and which represent a moving object 3 at different instants. The object 3 may be, for example, a workpiece which is irradiated by an X-ray source and which is moved past a stationary camera on a conveyer belt. The X-rays are converted into visible light by an image converter and the corresponding image is picked up by the camera. The images 1 and 2 also show a fault 4 which is caused, for example, by an imperfect target structure of the camera so that it is always situated in the same position in the images 1 and 2.

FIG. 1b shows the superposition of the images 1 and 2 in order to form an improved, low-noise superposition image 5. The images 1 and 2 have been superposed in a shifted manner with respect to one another in order to eliminate the shifting of the object 3 between the two images 1 and 2, i.e. the images of the object 3 now register due to the shifting. The object 3 thus clearly stands out in the superposition image 5, while the image noise is reduced by the superposition. Moreover, the faults 4 now appear at different locations in the superposition image 5. They are spread through the superposition image 5, so that they no longer dominate.

FIG. 2 shows the amplitude variations or the image information B1, B2 of the two images 1 and 2 along each time one image line or storage line Z1, Z2 (see FIG. 1a) (or the image signals B1(Z1) and B2(Z2)). Noise signals have been omitted for the sake of clarity. The object 3 or the pulse-shaped image information thereof has been shifted along the line Z2 over Z0 with respect to the object 3 on the line Z1. Line direction and shifting direction correspond in this case.

If the image information B1, B2 associated with different images is to be read and combined so that the measurement values associated with the same object points can be superposed, the shift Z0 of the image signals with respect to one another must be known. In this case, for example, the measurement values in the memory locations (or image points) Z1' and Z2'+Z0 can be read and superposed. The same holds good for the further memory locations.

The measurement values B2 in the memory line Z2, however, can also be shifted back in the line direction over a number of memory locations corresponding to the value of the shift Z0 in order to compensate for the shifting of the image points due to the object shift between the images. In that case the measurment values of each time corresponding memory locations Z1', Z1", . . . ; Z2', Z2", . . . are superposed.

If the shift Z0 of the object 3 between each time two images is known, for example, because the speed of the object 3 and the time interval between the images is known, the shift Z0 of the image information B2 with respect to the image information B1 is also known; this value can be used for controlling the read and superposition procedure for the measurement values in the described manner.

However, the shift Z0 is unknown in many cases, so that it must first be calculated from the variation of the image information B1, B2 etc. Several possibilities exist in this respect.

For example, the object shift Z0 can be determined by comparing the image information B1, B2 associated with relevant images with a threshold value S. The beginning and the end of the object 3 can thus be simply determined by associating all measurement values which exceed the threshold value S with the object 3, and vice versa. The object shift Z0 then results from the number of image points situated between the two object images.

The determination of the object shift Z0 between each time two images, however, can also be performed by shifting the image signals B1(Z1) and B2(Z2), i.e. the number of measurement values situated in the line direction Z1 or Z2, with respect to one another and by forming the cross-correlations of the image signals for different shift positions, the maximum value of the cross-correlation being subsequently determined. For each shift position the integral over the product of the two image signals B1(Z1), B2(Z2) is thus formed (cross-correlation). The cross-correlation is maximum only when the two image signals are coincident (register). The object shift (Z0) is then obtained, for example, from the number of shift steps, or from the length thereof, until the shift step is reached where the cross-correlation has its highest value.

The superposition of the image information B1 or B2 to be performed after the determination of the object shift Z0 in order to form the improved images can be performed, for example, by formation of the mean value of the measurement values associated each time with the same object points. The measurement values associated with the same object points, however, can also be subjected to a non-linear filtering process, for example, a mean value filtering process where each time only the measurement value which is situated approximately in the center of the range of measurement values examined is further used.

When a sequence of images of an object is recorded, it is advantageous for the determination of the object shift to use each time the latest image and an improved (superposition) image, or the corresponding measurement values, derived from the previous images of the sequence. It is thus achieved that the object shift can be determined with increasingly higher accuracy in order to improve the quality of the superposition images. The previous measurement values of the sequence can be weighted with a factor which is smaller as the image or the corresponding measurement values appear earlier in the image sequence in order to reduce the effect of images which are situated further back, in time.

FIG. 3 shows an embodiment of a device whereby the method in accordance with the invention can be performed. In order to record a sequence of images of the object 3 (not shown), there is provided a television camera 6 which is connected, by an analog-to-digital converter 7, to an electronic memory 8 for the storage of the digitized images. Inherent aberrations, for example, due to the central projection in the case of X-ray fluoroscopy (finite source distance) or due to a non-flat entrance screen of the television apparatus, can be corrected, because they are stationary, by corresponding storage in the memory 8, by restorage in an essentially smaller buffer memory 7a, or also by corresponding deformation of the approximately sawtooth-shaped deflection currents in the deflection generator 7b of the camera 6.

Using computer 9, the measurement values stored in the memory 8 can be used for the formation of improved superposition images as shown in the FIGS. 1 and 2. When the object shift is known, the computer 9 can use the shift directly for the reading and superposition of the measurement values in the memory 8. If it is not known, the computer 9 first calculates the object shift with the aid of the measurement values stored in the memory 8. For the correlation formation which can be performed one-dimensionally or two-dimensionally or with only image information representing a part of the images, the computer 9 is connected to a special processor 10 which quickly performs such correlations. The determination of the object shift with the aid of the threshold values S can also be performed by means of the computer 9.

The image data read by the computer 9 for superposition are subsequently applied to a further memory 11, by an adder circuit 12 and a multiplier 13. By a data line 14 which connects the further memory 11 to the second input of the adder 12, the measurement values stored in the further memory 11 can be added to the subsequent measurement values from the memory 8, or the sum thus formed can be multiplied by a factor in order to form the relevant mean value. The multiplier 13 can also be used to perform the formation of the weighted mean value. Finally, in the further memory 11 the improved superposition image is formed for display on a monitor 15 which is connected thereto.

What is claimed is:

1. A method for testing an object moving past a stationary electronic camera which records a sequence of images of said object comprising:
   generating relevant measurement values of said object by said stationary electronic camera,
   storing said measurement values of said object in an electronic memory,
   applying said measurement values to an evaluation device,
   superposing measurement values associated with the same object points by reading and combining measurement values associated with different images of said same object, and
   applying superposed measurement values to an image display device.

2. A method according to claim 1, wherein said measurement values stored in said electronic memory are used to determine shifts of said object between said different images, said object shifts controlling said reading and superposing steps.

3. A method according to claim 2, wherein said object shifts are determined by comparing said relevant measurement values with a threshhold value.

4. A method according to claim 2, wherein in order to determine object shifts for different shift positions cross-correlations are formed from image signals, said image signals consisting of measurement values situated in image shift directions, said images being shifted with respect to one another, and wherein a maximum value of said cross-correlations is subsequently determined.

5. A method according to claim 2, wherein object shifts for a sequence of images are determined from said measurement values each time the latest image and improved measurement values are obtained from previous images of said sequence.

6. A method according to claim 5, wherein said measurement values are weighted with a factor, said factor being smaller as said image appears earlier in said sequence.

7. A method according to claim 1, wherein for an improved display of said object, a mean value is determined of said superposed measurement values of relevant images.

8. A method according to claim 1, wherein said superposed measurement values are subjected to a nonlinear, medium value filtering process to improve display of said object.

9. A method according to claim 1, wherein said step of superposing forms a superposed image of said object.

10. A method according to claim 1, wherein image faults of said object appear in different locations of the superposed image of said object, such that noise is substantially suppressed.

* * * * *